(12) United States Patent
Lucido et al.

(10) Patent No.: US 6,488,852 B2
(45) Date of Patent: Dec. 3, 2002

(54) APPARATUS AND METHOD FOR BIOLOGICAL TREATMENT OF ENVIRONMENTAL CONTAMINANTS AND WASTE

(75) Inventors: John Lucido, Rocky Point, NY (US); Jon A. Shaffer, Huntington, NY (US)

(73) Assignee: Aqua-Novus™, Corp., Melville, NY (US)

( * ) Notice: Subject to any disclaimer, the term of this patent is extended or adjusted under 35 U.S.C. 154(b) by 0 days.

(21) Appl. No.: 10/023,470

(22) Filed: Dec. 17, 2001

(65) Prior Publication Data

US 2002/0053537 A1 May 9, 2002

Related U.S. Application Data

(62) Division of application No. 09/499,161, filed on Feb. 7, 2000, now Pat. No. 6,402,941.

(51) Int. Cl.[7] .................................................. C02F 3/00
(52) U.S. Cl. ..................... 210/610; 210/101; 210/105; 210/123; 210/170
(58) Field of Search ................................ 210/922, 610, 210/612, 614, 620, 94, 105, 121, 123, 134, 136, 149, 175, 180, 744, 101, 170

(56) References Cited

U.S. PATENT DOCUMENTS

| | | | | |
|---|---|---|---|---|
| 4,670,149 A | * | 6/1987 | Francis | 210/150 |
| 4,882,059 A | * | 11/1989 | Wong et al. | 210/606 |
| 4,925,564 A | * | 5/1990 | Francis | 210/608 |
| 4,940,539 A | * | 7/1990 | Weber | 210/149 |
| 5,171,687 A | * | 12/1992 | Moller et al. | 210/205 |
| 5,225,083 A | * | 7/1993 | Pappas et al. | 210/606 |
| 5,271,829 A | * | 12/1993 | Heppenstall | 210/127 |
| 5,299,141 A | * | 3/1994 | Hungerford et al. | 141/1 |
| 5,340,376 A | * | 8/1994 | Cunningham | 210/610 |
| 5,494,580 A | * | 2/1996 | Baskys et al. | 210/611 |
| 5,608,171 A | * | 3/1997 | Hunter et al. | 73/215 |
| 5,840,182 A | * | 11/1998 | Lucido et al. | 210/202 |
| 6,207,056 B1 | * | 3/2001 | Lucido et al. | 210/608 |
| 6,402,941 B1 | | 6/2002 | Lucido et al. | |

\* cited by examiner

*Primary Examiner*—Chester T. Barry
(74) *Attorney, Agent, or Firm*—Leo G. Lenna, Esq.

(57) ABSTRACT

The invention is directed to an apparatus for delivering activated microorganisms to an environment to be treated. The apparatus has a bioreactor containing microorganisms, a supply of organic and inorganic nutrients and a controller. The controller maintains the conditions of the bioreactor so as to maintain the microorganisms in the exponential phase of growth. The controller also doses a portion of the fluid in the bioreactor to the environment to be treated. The invention also provides a method for the biological treatment of wastes and an organic and inorganic composition used to feed the microorganisms in the bioreactor.

9 Claims, 2 Drawing Sheets

STEP 1

Inoculating or Restarting Bioreactor with Starter Culture

STEP 2

Growing Starter Culture to Exponential Growth Phase

STEP 3

Dosing a Pre-Determined Amount to Waste Environmental

STEP 4

Replenishing Solution Removed in Previous Step with Nutrients, Microorganisms and Water

STEP 5

Maintaining Temperature, pH, $O_2$ Concentration, Salinity and Cell Density of the Solution

STEP 6

Repeating Steps D and E According to a Predetermined Schedule

FIG. 2

APPARATUS AND METHOD FOR BIOLOGICAL TREATMENT OF ENVIRONMENTAL CONTAMINANTS AND WASTE

This application is a division of Ser. No. 09/499,161 filed Feb. 7, 2000, now U.S. Pat. No. 6,402,941.

FIELD OF THE INVENTION

The present invention relates to an apparatus and method for biological purification of wastes. More particularly, the invention relates to an apparatus and method for the treatment of wastes, such as grease and other contaminants contained in waste water streams, ground water, soil, etc. by introducing preconditioned living organisms to the environment to be treated in order to biodegrade the waste.

BACKGROUND OF THE INVENTION

Wastes, under normal conditions, are gradually broken down or biodegraded by indigenous microorganisms, in the environment. However, biodegradation reactions are often hindered by environmental fluctuations such as changes in temperature, pH, salinity, water and air supply, etc. For example, wastes such as fat and grease are biodegraded by microorganisms to fatty acids and glycerol. In the presence of oxygen the fatty acids are further metabolized with the end product being carbon dioxide and inert byproducts. Glycerol is also metabolized as an efficient energy source.

Waste water systems, for example those in the food service industry, typically incorporate a grease trap to capture grease and other contaminants from the passing flow of waste water and to store such contaminants for eventual removal from the trap. Typically, the grease trap is accessed periodically and the contaminants removed for eventual disposal. Grease and other contaminants often build up very quickly in such traps. If they are not removed in a timely fashion, the ability of the trap to operate efficiently, or at all, is seriously affected. When a trap is no longer functional, the contaminants will bypass the trap and flow into areas which are intended to be free from these contaminants. Specifically, the contaminants will either clog up the waste water system or will flow into the municipal sewer system in violation of local ordinances or state laws. Most grease traps require relatively large compartments, particularly if the associated food service facility operates on a large volume.

A variety of approaches have been developed to increase the required period between subsequent cleanings of a grease trap by increasing the bio-degradation by microorganisms of grease in the trap. One approach to enhancing bio-degradation of grease in a grease trap is to introduce chemicals or nutrients to the trap to aid naturally occurring bacteria or microorganisms in the trap. For example, U.S. Pat. No. 5,340,376 granted to Cunningham discloses a controlled-release nutrient source that adds nutrients at low levels to a biodegradation environment to enhance microorganisms growth and activity and promote the effectiveness of the biodegradation in removing environmental contaminants. The nutrients are in the form of coated solid particles, each having a core of water soluble microorganisms nutrients encapsulated in a release rate-controlling coating. The effectiveness of biodegradation of wastes by enhancing the growth of naturally occurring bacteria or microorganisms with the introduction of a controlled-release nutrient source is still hindered due to environmental fluctuations such as changes in temperature, pH, salinity, water and air supply, etc.

Another approach to enhancing bio-degradation of grease in a grease trap is to introduce a structure upon which indigenous microorganisms can bind and grow, and thus effectively remain in the grease trap. For example, U.S. Pat. No. 4,925,564 and U.S. Pat. No. 4,670,149 both granted to Francis disclose a bacterial incubator device having an enclosure with a forminous wall structure packed with high surface area elements such as spherical packing of a shape or size to multiply the solid bacterial growth surface area in a grease trap. The incubator is positioned at the interface of floating grease and water. Similarly, the effectiveness of biodegradation of wastes by enhancing the growth of naturally occurring bacteria or microorganisms with the introduction of a support structure is often hindered due to environmental fluctuations such as changes in temperature, pH, salinity, water and air supply, etc.

Still another approach to enhancing bio-degradation of grease in a grease trap is to introduce additional microorganisms into the grease trap. For example, U.S. Pat. No. 5,271,829 granted to Heppenstall discloses a treatment system for waste water which includes a dispenser for introducing treatment material, a solution of bacteria, into a grease trap for the purpose of digesting the grease which is separated from waste water as it flows through the grease trap. The dispenser includes a housing having a compartment for holding a quantity of grease digesting material and a dispensing opening at the lower end of the compartment. A restricter is located at the dispensing opening permitting the digesting material to pass at a constant restrictive rate from the dispensing opening to the grease to be treated in a chamber of the grease trap. The grease digesting material in the dispenser will naturally go through a four phase growth cycle (i.e., lag, exponential, stationary, and death, further described in detail in a Bacterial Growth Section below) which limits its effectiveness of enhancing the bio-degradation of grease on an extended or continuous basis.

Another example of introducing additional microorganisms in to a grease trap is U.S. Pat. No. 5,225,083 granted to Pappas, et al. Pappas, et al. discloses a simple method that includes adding endemic bacterial microorganisms to one or more of the drain lines for ultimate introduction into the grease trap and biodegrading grease. Depending on the bacterial microorganisms' growth cycle phases, the effectiveness of the bio-degradation of grease by the microorganisms will vary.

Another approach to enhancing bio-degradation of grease in a grease trap is to introduce enzymes into the grease trap to solubilize the grease. For example U.S. Pat. No. 4,940,539 granted to Weber discloses a grease trap comprising a housing having an inlet to receive waste water containing grease and an outlet. The waste water within the housing is heated by an electric heating element which is immersed in the waste water and the heating element is controlled by a thermostat to maintain a desired temperature of the water within a given range. An aqueous composition containing a mixture of enzymes and bacterial spores is introduced into the housing into contact with the waste water. The enzymes solubilize the grease while the bacteria spores biodegrade the grease. However, the ability of the bacteria to biodegrade waste will be delayed in that the bacterial spores first enter a lag phase requiring a period of time before entering an exponential growth phase in which to begin bio-degradation of the waste.

Another example. U.S. Pat. No. 4,882,059 granted to Wong, et al. discloses a method for solubilizing particulate materials in waste water which comprises the steps of cultivating aerobic bacteria in the presence of oxygen in an activator solution containing a food source until the level of the food source drops below a predetermined level causing the bacteria to begin producing increase amounts of enzymes and thereafter contacting the activating bacteria and enzymes with the particulate materials under conditions which solubilize the waste. Another example, shown in U.S. Pat. No. 5,171,687 granted to Moller, et al., discloses an apparatus for culturing and delivering microbes for waste treatment in a flow system. The apparatus includes a container having a first and second chambers. The first chamber is maintained in a nutrient rich environment for the source microbial matter supported therein while the second chambers is nutrient deficient. Water is introduced into the first chamber at a predetermined rate and flows through an outlet into the second chamber. The outlet of the second chamber is directed to a flow system benefiting from the activity of the microbial matter. In both Wong and Moller, et al., it is believed that starving the bacteria of nutrients activates enzyme production therein to aid in solubilizing particulate materials in waste water. Although the enzymes aid in solubilizing the grease, the bacteria will be ineffective in biodegrading the solubilized grease in that the bacteria being nutrient deficient will enter a stationary phase (if not death phase) necessitating that the bacteria enters a lag phase, requiring a period of time before the bacteria enters an exponential growth phase in which to begin to biodegrade the grease. In addition, enzyme hydrolysis by itself is believed to merely cause intact fatty acids to be produced which are likely to redeposit further down the sewer lines causing even greater commercial environmental damage.

Another example, U.S. Pat. No. 5,840,182 granted to Lucido et al. discloses an apparatus for incubating microorganisms and delivering microorganisms to an environment containing waste for bio-augmenting the bio-degradation of waste. This apparatus comprises three separate containers each containing a specific content. The three containers are arranged in a specific orientation and this arrangement mandates a directed flow of fluid.

The first container has a bioreactor chamber containing a bacterial culture. The second container has a chamber containing an aqueous solution of inorganic nutrients and a third container has a chamber containing an aqueous solution of organic nutrients. The third container being operably linked in a one-way fluid communication between the first container and the second container. The apparatus also contains a controller having a means for introducing a supply of the inorganic solution from the second container to the organic solution of the third container and a means for removing a portion of the bacterial culture from the first container and delivering it to the environment to be treated.

As stated above, the specific three container arrangement requires that the flow of aqueous inorganic solution in the second container be supplied to the organic nutrient containing third container. Once the inorganic solution of the second container mixes with the organic nutrients in the third container, a portion of the solution is supplied to the first container. The amount of inorganic nutrients provided to the third container from the second container is controlled by a pump in the controller. However, the amount of organic nutrients that dissolves in the aqueous inorganic solution supplied to the third container from the second container and then supplied to the first container, is not metered. Since the amount of organic nutrients that dissolves in the inorganic solution is affected by physical properties such as temperature, pressure concentration etc., the amount of organic nutrients provided to the bioreactor will fluctuate as these physical properties fluctuate. This makes stabilizing fluid conditions in the bioreactor, so as to maintain the microorganisms in exponential growth, almost impossible. As a result, the microorganisms dosed to the environment to be treated by the controller are not always in the exponential phase of growth. Thus, the ability of the microorganism to biodegrade waste will diminish, causing system failures which may result in clogging and increased maintenance of the apparatus.

If the environment of the bioreactor changes and causes the microorganisms to exit the exponential phase of growth, in order to return the microorganisms back to the exponential growth phase (so as to be most productive in bio-degrading waste) restabilization of the bioreactor environment is required. In other words, stabilization of the aqueous environment in the bioreactor, including the amount of organic and inorganic nutrients, is required.

Assuming conditions can be stabilized, the microorganisms will still have to pass through a lag phase in order to return back to the exponential growth phase. If the amount of fluid, nutrients and/or the physical properties such as temperature, pH, salinity, etc., fluctuate during this period it will disrupt the re-stabilization process of the bioreactor and even further delay the return of the microorganisms to exponential growth. Any microorganisms dosed to the waste environment during this period will not be in the exponential growth phase and therefore will not actively bio-degrade waste.

Moreover, assuming that the microorganisms in the bioreactor return to the exponential growth phase, once the concentration of inorganic and organic nutrients fluctuate in the bioreactor, the microorganisms will again exit the exponential growth phase and the cycle will begin all over again. As a result, the waste in the environment being treated will not be biodegraded and backups and clogs are likely to occur. As a result, waste may spill over into areas not intended for waste, and/or even cause waste to spill into the public sewage system in violation of local, state and/or federal laws.

There is a need for a waste bio-augmentation system for treatment of contaminants and waste products that is able to maintain the environment of the bioreactor, including the amount of fluid, organic nutrients, inorganic nutrients and other physical properties, so as to keep the microorganisms of the bioreactor in an exponential phase of growth. The microorganisms can then be delivered on a continuous or periodic basis to an environment containing contaminants and/or waste products for effectively bio-augmenting the bio-degradation of these contaminants and/or waste products. Such a system would require less maintenance and therefore be less expensive to operate. The present invention overcomes the shortcomings of existing systems.

SUMMARY OF THE INVENTION

The present invention provides a waste bio-augmentation system that adjusts the environment to be treated to a condition that is more conducive for bio-degradation of waste by introducing activated microorganisms designed for that purpose. Activated microorganisms are microorganisms that are in the exponential phase of growth. These microorganisms and more efficient in the biodegradation of waste than microorganisms that are not in the exponential phase of growth.

The bio-augmentation system comprises an apparatus for delivering activated, pre-conditioned, microorganisms to an environment to be treated comprising:

a first container comprising a bioreactor chamber comprising organic nutrients, inorganic nutrients and microorganisms;

a second container comprising a mixture of inorganic and organic nutrients;

a controller comprising:

a first independent pumping means for pumping inorganic and organic nutrients to the bioreactor from the second container, the first pumping means being in contact with the second container and the bioreactor; and a second independent pumping means for delivering a portion of the fluid from the bioreactor to the environment to be treated, the second pumping means being in fluid communication with the bioreactor and an environment to be treated.

The present invention also provides a method for the biological treatment of wastes comprising:

a) inoculating a bioreactor with a mixture comprising an aqueous solution of organic nutrients, inorganic nutrients, microorganisms that degrade waste;

b) incubating the microorganisms;

c) dosing a portion of the aqueous solution in the bioreactor to the environment to be treated;

d) replenishing the aqueous solution removed from the bioreactor with organic and inorganic nutrients; and e) repeating steps c) and d) according to a pre-determined schedule.

The present invention also provides a composition containing oleate used to feed microorganisms in the bioreactor comprising:

metal-oleate, $MgSO_4$, $CaCl_2$, $Na_2HPO_4$, $K_2HPO_4$, ferric NH citrite, $KHCO_3$, NaCl, Dextrose Citrate, Yeast Extract, Whey Extract, $NH_4NO_3$, $NH_4Cl$, $CoCl_2.6H_2O$, $CuSO_4$, $Na_2EDTA$, Molybolic Acid, $MnCl_2.4H_2O$, $ZnSO_4.7H_2O$, Vitamin A, Vitamin D, Vitamin E, Vitamin K, Thiamin, Riboflavin, Niacin, Vitamin $B_6$, Folic Acid, Vitamin $B_{12}$, Biotin, Pantothenic Acid, Calcium, Iron, Phosphorous, Iodine, Magnesium, Zinc, Selenium, Copper, Mn, Chromium, Molybdenum, Chloride, Potassium, Boron, Nickle, Silicon, Tin, Vanadium and trace elements. In addition, the above composition can also include one or all of the following anti-oxidants: Ascorbyl Palmitate, BHT, and alpha-Tocophenol in about 0.05% by weight.

BRIEF DESCRIPTION OF THE FIGURES

FIG. 2 is a flow chart description of the method.

DETAILED DESCRIPTION OF THE INVENTION

Figure 1:
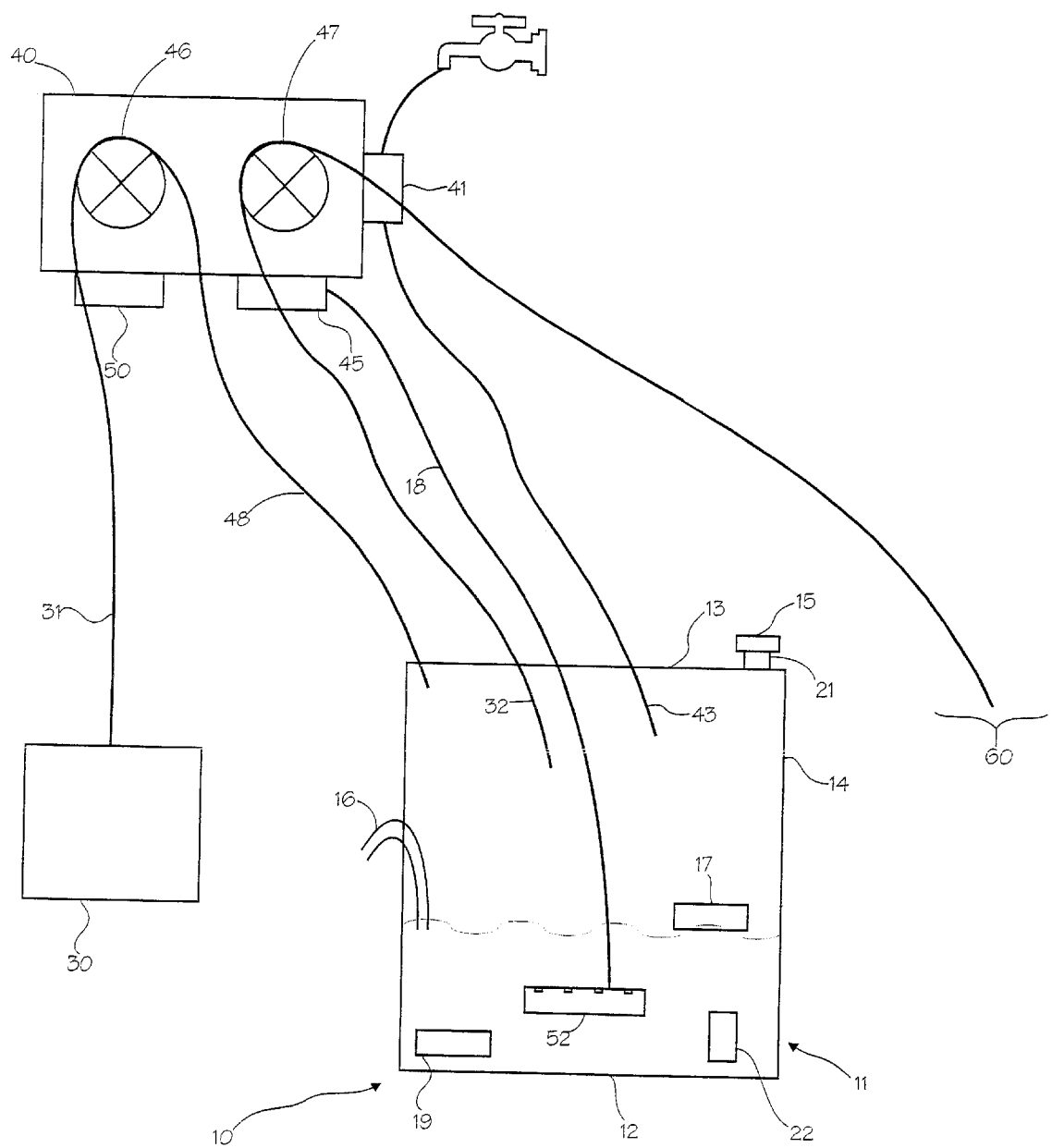
FIG. 1 is a schematic diagram of the apparatus of the invention.

The present invention is further described in conjunction with the figures. As shown in FIG. 1, the bio-augmentation system 10 embodies the present invention. The bio-augmentation system 10 includes (i) a bioreactor 11 having a bottom 12, a top 13, and a concentric side wall 14 connecting the top to the bottom making a closed container (ii) a food supply 30 and (iii) a controller 40. The apparatus may be of any shape or size, providing that the bioreactor container is essentially closed to the environment, i.e. having only controlled contact with the environment.

The controller 40 comprises several components that control and maintain conditions in bioreactor 11 that are necessary to keep the microorganisms of the bioreactor in the exponential phase of growth. A first pump 46 is connected to nutrient supply 30 and bioreactor 11. This pump draws inorganic and organic nutrients from the nutrient supply 30, via nutrient influent tube 31. The pump 46 delivers the nutrients to the bioreactor 11 via nutrient effluent tube 32.

The nutrient supply 30 contains organic and inorganic nutrients is provided as a complete food cup, or is in the form of liquid, powder or gel. The mode of delivery of these nutrients to the bioreactor 11 will depend on the physical state of the nutrients being transferred. For example, if the nutrient supply is in powder form it can be delivered via an automatic "hopper". A hopper is a container storing dry granular/powder material positioned above the bioreactor 11 so that the dry nutrients can be supplied to the bioreactor 11 according to a predetermined schedule or on demand via a release port. When the release port (not shown) is opened, the dry organic and inorganic nutrients are transferred to the bioreactor 11 by gravity. When the release port is closed, the nutrients are no longer delivered to the bioreactor 11. In one embodiment, the hopper contains a "shifter" that periodically agitates the dry nutrients stored in the hopper so that they do not pack together and block the release port.

If the organic and inorganic nutrients are in liquid form, they are delivered to the bioreactor 11 via effluent tube 32 by first pump 46. The first pump 46 can be a peristaltic pump, pneumatic pump or vacuum pump. It is clear to those skilled in the art that other liquid delivery systems may also be used to deliver the liquid organic and inorganic nutrients to the bioreactor 11. In addition, when a gel-based nutrient mixture is used, the nutrients are delivered by a displacement means. The displacement means, for example be a mechanical extractor that squeezes the gel from a container to the bioreactor. Other means for delivering the nutrients to the bioreactor are also possible and are intended to be within the scope of the present invention.

In another embodiment, the controller 40 is equipped with a timer 50 that activates the first pump 46 to dispense the organic and inorganic nutrients to the bioreactor 11 according to a pre-determined schedule. If the dry nutrient hopper described above is used, the timer 50 is used to open the release port of the hopper according to a pre-determined schedule. The timer 50 can be programmed to activate feeding on an hourly or daily basis. The feeding schedule depends on the particular mixture of microorganisms used in the apparatus, the desired cell concentration and the number of times a day that the microorganisms are fed. The timer 50 may be equipped with a programmable computer chip (not shown), which can be used to store scheduling information for dosing the inorganic and organic nutrients to the bioreactor 11.

The controller 40 also contains a second pump 47 that operates independently from the first pump 46 and is connected to the bioreactor 11 via influent tube 48. Influent tube 48 transports fluid containing microorganisms, inorganic and organic nutrients, as well as water from the bioreactor 11 to the second pump 47. The second pump 47 then delivers this fluid to the environment to be treated 60 via effluent tube 49. As with the delivery of inorganic and organic nutrients to the bioreactor 11, this process can be regulated by the controller according to a pre-determined schedule programmed into the timer 50 of the controller 40.

Maintaining a constant fluid level in the bioreactor 11 is necessary to assure that the microorganisms in the bioreactor remain in the exponential phase of growth. To maintain this constant fluid level, the amount water supplied to the bioreactor must be essentially equal to the amount of fluid removed from the bioreactor and dosed to the environment to be treated. When these two amounts are equal, a constant fluid level is maintained in the bioreactor. If more fluid is removed from the bioreactor than added, water must be supplied to the bioreactor in order to reestablish the fluid level. To accomplish this, water is supplied to a solenoid 41 by influent water supply tube 42. Supply tube 42 is attached to a continuous water supply, i.e. a faucet, at one end and to the solenoid 41 of the controller 40 at the other. When the solenoid 41 is opened, incoming water is supplied to the bioreactor 11 via effluent water tube 43. When the solenoid 41 is closed, incoming water can no longer enter the bioreactor 11.

To regulate the opening and closing of the solenoid, a fluid level sensor 17, i.e. float switch, is placed in the bioreactor 11 and is in communication with solenoid 41 via wire 52. Once the sensor 17 senses that the level of fluid in the bioreactor 11 has fallen below a predetermined level, this information is communicated to solenoid 41 via wire 52. As a result, the solenoid 41 switches to the open position and water flows into the bioreactor 11 via effluent water tube 43. When the fluid level in the bioreactor reaches a particular level, the level sensor 17 communicates this to the solenoid 41 via wire 52. As a result, the solenoid 41 switches to the closed position and water stops flowing into bioreactor 11 from the incoming water supply. In another embodiment, effluent water tube 43 is equipped with a backflow valve 44 that prevents the fluid in the bioreactor, which contains microorganisms, from backing up into the effluent water tube 43. This reduces the chance of contaminating the external water supply with microorganisms.

In another embodiment, the controller 40 is equipped with an air supply 45 that provides air, preferably oxygenated air, to the bioreactor via air supply tube 18. The air supply 45 can be a pump that delivers air to the bioreactor 11. In the alternative, the air supply 45 can be a pressurized air canister that provides oxygenated air to the bioreactor 11. The air supply tube 18 is connected to the air supply 45 at one end, enters the bioreactor 11 and terminates in the bioreactor solution containing nutrients and microorganisms at the other end. The air supply tube 18 may be open-ended or connected to an air provider 52, which supplies air through a plurality of openings instead of one opening. The air supply 45 may be constantly operating or attached to an oxygen sensor that provides oxygen concentration information to the controller.

When the level of oxygen in the solution of the bioreactor 11 falls below a pre-determined value, the sensor relays this information to the controller 40. The controller 40 then activates air supply 45, which provides oxygenated air to the bioreactor solution until the oxygen concentrated in the bioreactor 11 is re-established. Alternatively, an air supply 45 is activated directly without going to the controller 40 or is continuously supplying oxygen to the bioreactor 11.

The apparatus may also be fitted with an exhaust vent 21 on its surface. The exhaust vent 21 extends through the surface of the apparatus so that the internal environment of the bioreactor is in communication with the external environment. In one embodiment, the exhaust vent 21 is fitted with a biofilter 15 that allows excess gas to be released from the bioreactor 11, while preventing microorganisms from being released into the atmosphere. The biofilter 15 may be the type currently available on the market from Milliport Corp., i.e., Avervent 50.

The bioreactor 11 may also be equipped with an overflow tube 16 that has a first end positioned either above or below the fluid level in the bioreactor and a second end open to the external environment. Preferably, the overflow tube 16 is connected to a tube that directs overflow to the environment to be treated, i.e., drain line or grease trap. In one embodiment, the first end of the overflow tube 16 is positioned below the fluid level in the bioreactor and the second end that is exposed to the external environment curves downward so as to prevent air from entering the bioreactor. Since the first end of the overflow tube 16 is below the fluid level of the bioreactor 11 and the second end curves down, air in unable to enter the tube. In the alternative, a ball valve can be placed in the overflow tube to prevent air from escaping the bioreactor.

Pressure caused by the build up of excess fluid in the bioreactor forces fluid up the overflow tube 16 and out of the bioreactor 11. As the level of fluid in the bioreactor 11 returns back to normal, fluid in the overflow tube 16 recedes from the tube and no additional fluid is released.

The bioreactor 11 may also be equipped with a series of sensors designed to monitor various conditions of the bioreactor 11, including pH, temperature, and cell concentration. In one embodiment, a temperature sensor i.e. thermometer, is positioned in the solution of the bioreactor 11 and may be directly attached to a heater 19. The heater 19 can be either periodically activated when information is reversed by the controller from the temperature sensor that the temperature of the solution in the bioreactor has fallen below a predetermined temperature. More preferably, the temperature sensor/heater is an all-in-one unit. In other words, the heater is activated independent of the controller. In any event, either the controller 40 or the all-in-one unit activates the heater 19 as needed in order to maintain a temperature in the bioreactor 11 of about 40° F. to about 120° F. Preferably the temperature of the bioreactor 11 is maintained at about 70° F. to about 100° F. More preferably, the temperature is maintained at 90° F. In addition, the temperature of the bioreactor 11 can be adjusted to the optimum temperature of the particular microorganisms used in the bioreactor 11.

In another embodiment, the bioreactor 11 is also equipped with an optical density sensor 22 which detects the turbidity of the solution in the bioreactor 11. The higher the turbidity reading in the bioreactor 11, the higher the viable cell concentration. When the turbidity of the solution in the bioreactor 11 drops below a critical level, an alarm (not shown) is activated. The alarm maybe in the form of a flashing light or may be audible. In one embodiment, the alarm is hooked up to a computer via telephone lines which relays the sounding of the alarm to a central station. At this station the problem can be assessed and a repair unit dispatched if needed.

In still yet another embodiment, the apparatus 10 is equipped with a conductivity sensor 23 which is used to measure the ion concentration in the bioreactor 11. As with the turbidity sensor, the conductivity sensor 23 may be attached to an alarm which is activated when the ion concentration fluctuates above or below a pre-determined level. This predetermined level is between about 80 microsiemans and about 800 microsiemans. More preferably the ion concentration is 150 microsiemans. The alarm may also be hooked up to a computer via telephone lines which relays the change in ion concentration in the bioreactor to a central station. As with the optical sensor, the central station can assess the problem and dispatch a repair unit if needed.

In another embodiment, a pH meter is used to measure the pH of the bioreactor. One skilled in the art would realize that other measuring tools can be used to meter and regulate the physical conditions in the bioreactor.

The present invention also includes a method for the bio-augmentation of a contaminated environment using pre-acclimated microorganisms. FIG. 2 represents a flow chart that illustrates a series of steps which are included in the method. The method includes the following steps:

STEP 1) inoculating or restarting the bioreactor with about 10% to about 50% of the total volume of the bioreactor, preferably about 20% to about 40% and most preferably about 25% to about 35% of the total volume of the bioreactor with a starter culture;

STEP 2) incubating the microorganisms of the starter culture in the bioreactor for a period of about 12 to about 96 hours, preferably about 24 to about 48 hours and most preferably about 12 to about 24 hours, or until the microorganisms are in the exponential phase of growth without removing any of the solution (i.e. no dosing);

STEP 3) dosing a pre-determined amount of fluid containing microorganisms from the bioreactor when the starter culture is fully in the exponential growth phase and delivering it to the environment to be treated;

STEP 4) replenishing the amount of solution removed form the bioreactor with water, and organic and inorganic nutrients; and STEP 5) repeating Steps (3) and (4) according to a pre-determined schedule.

In another embodiment, step 2 above is completed outside the bioreactor and poured into the bioreactor at after the microorganisms are in the exponential phase of growth.

The microorganisms in the starter material used in Step 1 may vary upon the type of contaminant to be treated. In one embodiment, when the microorganisms are used to degrade hydrocarbons, i.e. grease, the starter material contains at least one microorganism selected from the group consisting essentially of *Baccilus licheniformis, Bacillus subtilis, Pseudomonas fluorescens E, Pseudomonas putida, Enterobacter cloacae,* and *Bacillus thuringienis*. The starter material will have a concentration of cells of at least $1 \times 10^4 \times$ per fluid ml as well as the essential inorganic and organic nutrients to maintain the cell culture in the exponential phase of growth. The content and concentration of the inorganic and organic nutrients in the food will vary with the type of microorganism used in the apparatus.

In one embodiment, a composition containing organic and inorganic nutrients that is used as part of a starter material, comprises the following nutrients:

a metal-oleate, preferably K-oleate, and one or more of the following components;

magnesium sulfate, calcium chloride, potassium phosphate, sodium phosphate, sodium EDTA, sodium hydroxide, ferric NH citrate, potassium bicarbonate, sodium chloride, dextrose, citrate, yeast extract, whey extract, ketrol, ammonium nitrate, ammonium chloride, glycerin, Tween 20, Tween 80, corn oil, Simethylcone, and trace elements that include but are not limited to copper sulfate, cobalt(II) chloride, Sodium EDTA, Molybolic acid, $MnCl_2\text{-}7H_2O$, and zinc sulfate.

Preferably the composition described above comprises about 50 to about 60 weight % of water, about 20 to about 30 weight % K-oleate, about 2 to about 3 weight % glycerin, about 3 to about 10 weight % of vegetable oil and less than about 1 weight % of compounds selected from the group consisting essentially of $MgSO_4$, $CaCl_2$, $Na_2HPO_4\text{-}7H_2O$, $K_2HPO_4$, NaCl, Dextrose, Citrate, Yeast Extract, Whey Extract, Trace elements, Sodium EDTA, Keltrol, Ferric NHcitrate, NaOH, $NH_4NO_3$, $NH_4Cl$, Tween 20, Tween 80, and Simethylcone. Most preferably the vegetable oil is a mixture of about 4 to about 5 weight % of corn oil and about 5 to about weight 6% canola oil/peanut oil.

The composition described above can be prepared by mixing metal-oleate, glycerin, Tween 20, Tween 80, water, and Keltrol in a mixing kettle. $MgSO_4$, $CaCl_2$, Sodium EDTA is added to 1 gallon of water and the pH is brought to about 8 to about 10, preferably about 9 using about 10N NaOH. This mixture is then added to the mixing kettle and is mixed for about 2 minutes. To about 5 gallons of water the $Na_2HPO_4\text{-}H_2O$ and $K_2HPO_4$ is added. The pH is brought to about 8 to about 10, preferably about 9 using about 10N NaOH. This mixture is added to the mixing kettle after 2 minutes of mixing. In about 8 gallons of water the NaCl, Dextrose, Citrate, Yeast Extract, Whey Extract, $NH_4NO_3$, $NH_4Cl$, $CoCl_2.6H_2O$, $CuSO_4$, $Na_2$ EDTA, Molybolic Acid, $MnCl_2.4H_2O$, $ZnSO_4.7H_2O$, Vitamin A, Vitamin D, Vitamin E, Vitamin K, Thiamin, Riboflavin, Niacin, Vitamin $B_6$, Folic Acid, Vitamin $B_{12}$, Biotin, Pantothenic Acid, Calcium, Iron, Phosphorous, Iodine, Magnesium, Zinc, Selenium, Copper, Mn, Chromium, Molybdenum, Chloride, Potassium, Boron, Nickle, Silicon, Tin and Vanadium are mixed.

In a separate container dissolve Sodium EDTA and ferric NHcitrate in about 200 ml of hot water and add to the mixture above. The 8 gallon mixture bring the pH to about 9 to about 10, preferably about 9 and add to the mixing kettle. Finally add the corn oil and canola oil to the mixing kettle and sprinkle $NH_4NO_3$ and $NH_4Cl$ into the mixing kettle. Mix thoroughly and fill dispensing container immediately. An anti-foaming agent may be added to the kettle prior to dispensing. The pH of the final mixture should be about 9 to about 10, preferably about 9.3 to about 9.6. As stated above, when the above composition is used as a starter material, at least one microorganisms selected from the group consisting essentially of *Baccilus licheniformis, Bacillus subtilis, Pseudomonas fluorescens E, Pseudomonas putida, Enterobacter cloacae,* and *Bacillus thuringienis* may be added prior to inoculation of the bioreactor. It is within the scope of the invention to substitute microorganism not listed that are capable of digesting waste.

While the invention has been illustrated and described with respect to specific illustrative embodiments and modes of practice, it will be apparent to those skilled in the art that various modifications and improvements may be made without departing from the scope and spirit of the invention. Accordingly, the invention is not to be limited by the illustrative embodiment and modes of practice.

What is claimed is:

1. A method for the biological treatment of an environment containing waste comprising:

a) inoculating a bioreactor with a mixture comprising an aqueous solution of organic nutrients, inorganic nutrients and microorganisms that degrade waste;

b) incubating the microorganisms prior to dosing a portion of the aqueous solution from the bioreactor to the environment to be treated;

c) dosing a portion of the aqueous solution in the bioreactor from the bioreactor to the environment to be treated;

d) replacing the aqueous solution removed from the bioreactor with an aqueous solution of organic and inorganic nutrients; and e) repeating steps (c) and (d) according to a pre-determined schedule.

2. A method for the biological treatment of an environment containing waste according to claim 1 wherein the microorganisms are incubated for about 36 to about 96 hours.

3. A method for the biological treatment of an environment containing waste according to claim 1 wherein the microorganisms are incubated for about 24 to about 36 hours.

4. A method for the biological treatment of an environment containing waste according to claim 1 wherein the mixture comprises:
   a fluid containing microorganisms from the bioreactor wherein at least a portion of the microorganisms are in the exponential growth phase.

5. A method for the treatment of an environment containing wastes according to claim 1 wherein steps (c) and (d) are repeated at least three times a day.

6. A method for the treatment of an environment containing wastes according to claim 1 wherein step (b) is performed outside the bioreactor and the microorganisms are subsequently placed into the bioreactor.

7. A method for the biological treatment of an environment to be treated comprising:
   continually dosing a bacterial composition from an apparatus for delivering microorganisms to an environment to be treated wherein the apparatus comprises:
   a first container having a bioreactor chamber comprising organic nutrients, inorganic nutrients and microorganisms;
   a second container comprising a mixture of inorganic and organic nutrients;
   a controller comprising:
   a means for maintaining a constant fluid level in the bioreactor;
   a first independent pumping means for pumping inorganic and organic nutrients to the bioreactor from the second container, the first pumping means being in contact with the second container and the bioreactor; and
   a second independent pumping means for delivering a portion of the fluid from the bioreactor to the environment to be treated while inorganic and organic nutrients are pumped to said bioreactor, the second pumping means being in fluid communication with the bioreactor and an environment to be treated.

8. A method for the biological treatment of an environment to be treated according to claim 7 wherein the apparatus further comprises a reservoir in fluid communication with the means for maintaining a constant fluid level in the bioreactor wherein the means for maintaining a constant fluid level in the bioreactor provides water from the reservoir to the bioreactor to maintain a constant fluid level.

9. A method for the biological treatment of an environment to be treated according to claim 8 wherein the controller comprises a programmable memory and an actuator, the controller being in communication with the first and second independent pumping means wherein the actuator activates the first independent pumping means for pumping inorganic and organic nutrients to the bioreactor from the second container nutrient and the second independent pumping means for delivering a portion of the fluid from the bioreactor to the environment to be treated while inorganic and organic nutrients are pumped to said bioreactor water pumping means according to a predetermined schedule stored in the programmable memory of the controller.

* * * * *